(12) United States Patent
Cranor

(10) Patent No.: US 6,267,914 B1
(45) Date of Patent: Jul. 31, 2001

(54) VARIABLE CHEMILUMINESCENT PROCESS AND PRODUCT

(75) Inventor: Earl Cranor, Longmeadow, MA (US)

(73) Assignee: Omniglow Corporation, West Springfield, MA (US)

(*) Notice: Subject to any disclaimer, the term of this patent is extended or adjusted under 35 U.S.C. 154(b) by 0 days.

(21) Appl. No.: 09/431,813

(22) Filed: Nov. 2, 1999

(51) Int. Cl.$^7$ .................................................. C09K 3/00
(52) U.S. Cl. ................................... 252/700; 364/34
(58) Field of Search ................................ 252/700; 362/34

(56) References Cited

U.S. PATENT DOCUMENTS

| | | |
|---|---|---|
| 3,597,362 | 8/1971 | Bollyky et al. . |
| 3,691,085 | 9/1972 | Roberts et al. . |
| 3,704,231 | 11/1972 | Bollyky . |
| 3,775,366 | 11/1973 | Wolff et al. . |
| 4,379,320 * | 4/1983 | Mohan et al. .................. 252/700 |
| 4,678,608 * | 7/1987 | Dugliss ........................... 252/700 |
| 4,698,183 * | 10/1987 | Koroscil .......................... 252/700 |
| 4,717,511 * | 1/1988 | Koroscil .......................... 252/700 |
| 5,158,349 * | 10/1992 | Holland et al .................. 252/700 |
| 5,705,103 * | 1/1998 | Chopdekar et al. ............. 252/700 |
| 5,824,242 * | 10/1998 | Ladyjensky ..................... 252/700 |

* cited by examiner

*Primary Examiner*—Philip Tucker
(74) *Attorney, Agent, or Firm*—McHale & Slavin

(57) ABSTRACT

This invention is directed toward a process for producing chemiluminescent light of varying coloration and to devices which utilize the process. The process incorporates multiple fluorescers, at variable concentrations, having varying degrees of stability in peroxide. At the onset of the reaction, chemiluminescent light is generated by both the peroxide stable and less stable, e.g. peroxide unstable fluorescers, resulting in a first visible color. As the peroxide attacks the unstable fluorescer, its predominant color fades, and a different color is perceived. Inclusion of this process in chemiluminescent light producing devices results in a device which changes colors during its useful life.

4 Claims, No Drawings

VARIABLE CHEMILUMINESCENT PROCESS AND PRODUCT

FIELD OF THE INVENTION

This invention relates to chemiluminescent processes and in particular to a chemiluminescent product and process which utilizes both peroxide stable and peroxide unstable fluorescers; said process and product are capable of expressing an initial color upon activation and an alternative color or colors as a reaction progresses.

BACKGROUND OF THE INVENTION

Chemiluminescence relates to the production of visible light attributable to a chemical reaction. The important aqueous chemiluminescence substances luminal and lucigenin were discovered in 1928 and 1935, respectively. A series of organic soluble chemiluminescent materials were developed in the early 1960's based upon a study of the luminescent reactions of a number of oxalate compounds. A typical organic system useful for chemiluminescence was disclosed by Bollyky et al., U.S. Pat. No. 3,597,362 and claimed to exhibit a quantum efficiency of about 23% compared with about 3% for the best known available aqueous systems.

In its most basic form the two-component, liquid phase oxalate ester chemical light system must comprise an "oxalate component" comprising an oxalic acid ester and a solvent, and a "peroxide component" comprising hydrogen peroxide and a solvent or mixture of solvents. In addition, an efficient fluorescer must be contained in one of the components. An efficient catalyst, necessary for maximizing intensity and lifetime control, may be contained in one of the components.

The oxalate component provides an oxalate ester-solvent combination which permits suitable ester solubility and storage stability. The peroxide component provides a hydrogen peroxide-solvent combination which permits suitable hydrogen peroxide solubility and storage stability.

The solvents for the two components may be different but should be miscible. At least one solvent solubilizes the efficient fluorescer and at least one solvent solubilizes the efficient catalyst. The fluorescer and at least one solvent solubilizes the efficient catalyst. The fluorescer and catalyst are normally placed as to permit both solubility and storage stability in the final components.

Typical suitable fluorescent compounds for use in the present invention are those which have spectral emission falling between 300 and 1200 nanometers and which are at least partially soluble in the diluent employed. Among these are the conjugated polycyclic aromatic compounds having at least 3 fused rings, such as: anthracene, substituted anthracene, benzanthracene, phenanthrene, substituted anthracene, benzanthracene, phenanthrene, substituted phenanthrene, naphthacene, substituted naphthacene, pentacene, substituted pentacene, perylene, substituted perylene, violanthrone, substituted violanthrone, and the like. Typical substituents for all of these are phenyl, lower alkyl ($C_1$–$C_6$), chloro, bromo, cyano, alkoxy ($C_1$–$C_{16}$), and other like substituents which do not interfere with the light-generating reaction contemplated herein.

The preferred fluorescers are 9,10-bis(phenylethynyl) anthracene, 1-methoxy-9,10-bis(phenylethynyl)anthracene, perylene, 1,5-dichloro 9,10-bis(phenylethynyl) anthracene, rubrene, monochloro and dichloro substituted 9,10-bis (phenylethynyl) anthracene, 5,12-bis(phenylethynyl) tetracene, 9,10-diphenyl anthracene, and 16,17-dihexyloxyviolanthrone.

The term "peroxide component," as used herein, means a solution of a hydrogen peroxide compound, a hydroperoxide compound, or a peroxide compound in a suitable diluent.

The term "hydrogen peroxide compound" includes (1) hydrogen peroxide and (2) hydrogen peroxide-producing compounds.

Hydrogen peroxide is the preferred hydroperoxide and may be employed as a solution of hydrogen peroxide in a solvent or as an anhydrous hydrogen peroxide compound such as sodium perborate, sodium peroxide, and the like. Whenever hydrogen peroxide is contemplated to be employed, any suitable compound may be substituted which will produce hydrogen peroxide. The hydrogen peroxide concentration in the peroxide component may range from about 0.2M to about 15M. Preferably, the concentration ranges from about 1M to about 2M.

The lifetime and intensity of the chemiluminescent light emitted can be regulated by the use of certain regulators such as:

(1) by the addition of a catalyst which changes the rate of reaction of hydroperoxide. Catalysts which accomplish that objective include those described in M. L. Bender, "Chem. Revs.," Vol. 60, p. 53 (1960). Also, catalysts which alter the rate of reaction or the rate of chemiluminescence include those accelerators of U.S. Pat. No. 3,775,366, and decelerators of U.S. Pat. Nos. 3,691,085 and 3,704,231, or (2) by the variation of hydroperoxide. Both the type and the concentration of hydroperoxide are critical for the purposes of regulation.

Of the catalysts tried, sodium salicylate and various tetraalkylammonium salicylates have been the most widely used. Lithium carboxylic acid salts, especially lithium salicylate, lithium 5-t-butyl salicylate and lithium 2-chlorobenzoate are excellent catalysts for low temperature hydrogen peroxide/oxalate ester/fluorescer chemiluminescent systems.

As outlined above, chemical light is produced by mixing an oxalate ester and hydrogen peroxide together in the presence of a catalyst and a fluorescer. Typically, fluorescers were chosen that were peroxide stable to provide a long lasting glow. In most instances, a single fluorescer has been used to produce a particularly colored light. In some cases, two or more fluorescers of essentially equivalent stability in peroxide have been mixed to produce a blended color. As an example, a blue emitting fluorescer will be mixed with a red emitting fluorescer to make a pink light.

Of the numerous fluorescers outlined above, relatively few emit light in peroxyoxalate chemiluminescence and are sufficiently peroxide stable (five phenylethynyl anthracenes, one violanthrone, and three perylene dicarboximides) to yield commercially viable products. While other fluorescers are known to emit light they are not peroxide stable, and have historically been rejected for commercial use.

Thus, while chemical lighting devices utilizing such systems have been available commercially for more than two decades, the majority of these devices have emitted a single color. Exceptions have been two, three, or five color devices, e.g. in the form of necklaces, where the multiple colors are discrete bands or sections, each formulated to emit a single color within the device.

In every device, however, the color emitted by the device or section of the device has been a constant, single color. Green starts and stays green, blue starts and stays blue, etc.

Therefore, the instant invention has perfected a process for producing chemical lighting devices which are capable of expressing differently colored lights during the course of the ongoing reaction.

SUMMARY OF THE INVENTION

The present invention embraces the concept of incorporating multiple fluorescers, at varying concentrations, and having varying degrees of stability in peroxide, in chemiluminescent reaction mixtures. It has been discovered that such mixtures are able to express one particularly colored light at the onset of the reaction and express a differently colored light as the reaction progresses.

Oxalate ester chemiluminescent systems contemplated as useful for the present invention will ordinarily include an oxalate type ester, a peroxide activator, a plurality of fluorescent compounds effective to control the frequencies of light emitted over time as a result of the reaction between the ester and the peroxide, a catalyst to accelerate the reaction and a solvent or mixture of solvents in which the other constituents are dissolved or suspended.

A typical chemical light device in accordance with the present invention is formed from the oxalate ester, hydrogen peroxide, catalyst, and a peroxide stable fluorescer or fluorescer blend. Examples of peroxide stable fluorescers include, but are not limited to:
9,10-Bis-(Phenylethynyl)Anthracene
2-Methyl-9,10-Bis-(Phenylethynyl)Anthracene
1-Chloro-9,10-Bis-(Phenylethynyl)Anthracene
9,10-Bis-(4-Methoxyphenyl)-2-Chloroanthracene
9,10-Bis-(4-Ethoxyphenyl)-2-Chloroanthracene
16,17-Didecycloxyviolanthrone
LUMOGEN RED® (a red-emitting perylene dicarboximide fluorescer)
LUMOGEN YELLOW® (a yellow emitting perylene dicarboximide fluorescer)
LUMOGEN ORANGE® (an orange emitting perylene dicarboximide fluorescer)

In addition to the normal ingredients, a quantity of a peroxide unstable fluorescer is added. Examples of peroxide unstable fluorescers include, but are not limited to:
5,12-Bis-(Phenylethynyl) Napthacene
5,16,11,12-Tetraphenylnapthacene.

At the onset of the reaction, the device will luminesce and light will be generated by both the peroxide stable and peroxide unstable fluorescers. The perceived color being that of the peroxide unstable fluorescer or (depending on concentrations) the combination of the stable and unstable fluorescers. As the peroxide attacks the unstable fluorescer and it suffers degradation, its predominant color fades. The color emitted by the stable fluorescer then becomes the only color perceived. The observer thus perceives that the device changes from one color to another.

Accordingly, it is an objective of the instant invention to teach a process for producing chemiluminescent light which incorporates a combination of peroxide stable and peroxide unstable fluorescers in a single reaction mixture.

It is a further objective of the instant invention to teach a process wherein the light generated by the instant process expresses an initial visible frequency which yields to one or more alternatively visible frequencies as a function of reaction time.

It is yet another objective of the instant invention to teach a chemiluminescent device which functions in accordance with the steps taught by the instant process, thereby providing a single device capable of expressing multiple colors within the visible spectrum during its useful reaction life.

Other objects and advantages of this invention will become apparent from the following description wherein are set forth, by way of illustration and example, certain embodiments of this invention.

DETAILED DESCRIPTION OF THE INVENTION

A typical chemical light device in accordance with the present invention is formed from the oxalate ester, hydrogen peroxide, catalyst, and a peroxide stable fluorescer or fluorescer blend. In addition to the normal ingredients, a quantity of a peroxide unstable fluorescer is added. Thus, a fluorescer component mixture is created which is selected from a first group of fluorescer components having a first peroxide stability and a second group of fluorescer components having a second peroxide stability, the second group being less peroxide stable than the first group. At the onset of the reaction, the device will luminesce and light will be generated by both the peroxide stable and peroxide unstable fluorescers. The perceived color being that of the peroxide unstable fluorescer or (depending on concentrations) the combination of the stable and unstable fluorescers. As the peroxide attacks the unstable fluorescer and it suffers degradation, its predominant color fades. The color emitted by the stable fluorescer then becomes the only color perceived. The observer thus perceives that the device changes from one color to another. Appropriate selection of fluorescers of varying stability will result in the production of two or more colors from a discrete mixture of reactants during the reaction period.

This phenomenon is more particularly illustrated by the following examples:

EXAMPLE 1

A Tri-color Lite-Rope® Necklace is made with green, red and blue sections. The peroxide stable fluorescers 2-Methyl-9,10-Bis-(Phenylethynyl) Anthracene(Green), LUMOGEN RED (a perylene dicarboximide) (Red), and 9, 10-Bis-(4-Methoxyphenyl)-2-Chloroanthracene (Blue) are used. A peroxide unstable fluorescer 5,16,11,12-Tetraphenylnapthacene) is added to each colored section. The resulting device glows a bright orange when activated by the end user. After 30–40 minutes, the orange color fades and the three separate colors of green, red, and blue are revealed.

The following concentrations of fluorescers are used:

| Final Section Color | Stable Fluorescer | Unstable Fluorescer |
|---|---|---|
| Green | 2-Methyl-9,10-Bis-(Phenylethynyl) Anthracene 0.1% by weight | 5,16,11,12-Tetraphenylnapthacene 0.08% by weight |
| Red | LUMOGEN RED 0.015% by weight | 5,16,11,12-Tetraphenylnapthacene 0.06% by weight |
| Blue | 9,10-Bis-(4-Methoxyphenyl)-2-Chloro-Anthracene 0.48% by weight | 5,16,11,12-Tetraphenylnapthacene 0.15% by weight |

EXAMPLE 2

A 6" Purple Glow Stick® Light Stick is made with a combination of peroxide stable fluorescers 9,10-Bis-(4-Methoxyphenyl)-2-Chloroanthracene and LUMOGEN RED. A peroxide unstable fluorescer (5,12-Bis (Phenylethynyl) Napthacene) is added. The resulting device glows a bright Peach color when activated by the end user. After 30–40 minutes, the Peach color fades and the Purple color is revealed.

EXAMPLE 3

A 6" Blue Glow Stick® Light Stick is made with a peroxide stable fluorescer 9,10-Bis-(4-Methoxyphenyl)-2 Chloroanthracene. A peroxide unstable fluorescer 5,16,11, 12-Tetraphenylnapthacene is added. The resulting device glows a bright White color when activated by the end user. After 30–40 minutes, the White color fades and the Blue color is revealed.

It is to be understood that while a certain form of the invention is described, it is not to be limited to the specific form or arrangement herein described. It will be apparent to those skilled in the art that various changes may be made without departing from the scope of the invention and the invention is not to be considered limited to what is described in the specification.

What is claimed is:

1. A process for producing chemiluminescent light of different colors from a discrete reaction mixture comprising:

selecting an effective amount of an oxalate component;

selecting an effective amount of a peroxide component;

selecting an effective amount of a fluorescer component mixture, wherein said fluorescer component mixture is selected from one or more of a first group of fluorescer components having a first peroxide stability and one or more of a second group of fluorescer components having a second peroxide stability, the second group being less peroxide stable than the first group;

selecting an effective amount of a catalyst; and reacting said oxalate component, peroxide component, fluorescer component mixture and catalyst;

such that at the onset of the chemiluminescent reaction, light having a first coloration will be produced and upon degradation of a less peroxide stable fluorescer, light having a different coloration will be produced.

2. The process for producing chemiluminescent light of different colors from a discrete reaction mixture in accordance with claim 1, wherein:

said first group of fluorescer components is selected from the group consisting of 9,10-Bis-(Phenylethynyl) Anthracene, 2-Methyl-9,10-Bis-(Phenylethynyl) Anthracene, 1-Chloro-9,10-Bis-(Phenylethynyl) Anthracene, 9,10-Bis-(4-Methoxyphenyl)-2-Chloroanthracene, 9,10-Bis-(4-Ethoxyphenyl)-2-Chloroanthracene, 16,17-Didecycloxyviolanthrone, a red-emitting perylene dicarboximide, a yellow-emitting perylene dicarboximide, an orange emitting perylene dicarboximide and mixtures thereof.

3. The process for producing chemiluminescent light of different colors from a discrete reaction mixture in accordance with claim 1, wherein:

said second group of fluorescer components is selected from the group consisting of 5,12-Bis-(Phenylethynyl) Napthacene, 5,16,11,12-Tetraphenylnapthacene and mixtures thereof.

4. A chemiluminescent light producing device incorporating the process of claim 1.

* * * * *